US012620085B2

(12) United States Patent
Cao et al.

(10) Patent No.: US 12,620,085 B2
(45) Date of Patent: May 5, 2026

(54) IMAGING SYSTEM AND METHOD TO ESTIMATE CONTOUR OF A SCANNED OBJECT

(71) Applicant: GE Precision Healthcare LLC, Wauwatosa, WI (US)

(72) Inventors: Ximiao Cao, Beijing (CN); Bingjie Zhao, Beijing (CN); Xueli Wang, Beijing (CN); Jiang Hsieh, Waukesha, WI (US)

(73) Assignee: GE Precision Healthcare LLC, Wauwatosa, WI (US)

( * ) Notice: Subject to any disclaimer, the term of this patent is extended or adjusted under 35 U.S.C. 154(b) by 487 days.

(21) Appl. No.: 17/939,170

(22) Filed: Sep. 7, 2022

(65) Prior Publication Data

US 2023/0077083 A1      Mar. 9, 2023

(30) Foreign Application Priority Data

Sep. 8, 2021      (CN) .......................... 202111049401.2

(51) Int. Cl.
| | |
|---|---|
| *G06T 7/13* | (2017.01) |
| *G06T 7/00* | (2017.01) |
| *G06N 3/02* | (2006.01) |

(52) U.S. Cl.
CPC .. *G06T 7/0012* (2013.01); *G06T 2207/10081* (2013.01)

(58) Field of Classification Search
CPC . G06T 2207/10016; G06T 2207/10081; G06T 2207/20084; G06T 7/0012; G06T 7/13; G06T 7/73

(Continued)

(56) References Cited

U.S. PATENT DOCUMENTS

| | | | |
|---|---|---|---|
| 2007/0076933 A1 | 4/2007 | Starman | |
| 2007/0116344 A1* | 5/2007 | Hsieh ..................... | A61B 6/032 |
| | | | 382/131 |

(Continued)

FOREIGN PATENT DOCUMENTS

| | | | | |
|---|---|---|---|---|
| CN | 111260771 A | * | 6/2020 | ........... G06T 11/003 |
| CN | 106308836 B | * | 7/2021 | |

OTHER PUBLICATIONS

Sun '836 called Feng in the rejection. (Year: 2021).*

(Continued)

*Primary Examiner* — Chad Dickerson

(57) ABSTRACT

Described herein are an imaging system and method. Specifically, the imaging system includes a positioning image acquisition unit configured to acquire positioning images of a scanned object from a plurality of angles, a contour estimation unit configured to estimate a contour of the object in each positioning image in a scanning direction when truncation is present in at least one positioning image, and a display field of view determination unit configured to select a maximum value of an estimated contour as a display field of view of the image. A contour of a scanned object in each positioning image in a scanning direction is estimated when truncation is present in at least one positioning image, thereby determining a suitable display field of view. An appropriate display field of view can be set, so that a reconstructed image can cover the entire contour of the object and have a higher resolution.

9 Claims, 12 Drawing Sheets

(58) Field of Classification Search
USPC ........................................................ 382/128
See application file for complete search history.

(56) References Cited

U.S. PATENT DOCUMENTS

| 2010/0195804 A1* | 8/2010 | Dafni ..................... A61B 6/585 |
| | | 378/207 |
| 2011/0103669 A1* | 5/2011 | Michel ................. G06T 11/005 |
| | | 382/131 |
| 2019/0164317 A1* | 5/2019 | Tang .................... A61B 6/5205 |
| 2021/0065360 A1* | 3/2021 | Laaksonen ............. G06V 10/25 |

OTHER PUBLICATIONS

Feng '771 cited. (Year: 2020).*
Beyer et al., "Whole-Body 18F-FDG PET/CT in the Presence of Truncation Artifacts", Journal of Nuclear Medicine Jan. 2006, 47 (1) 91-99, 9 pages.
Chityala et al., "Artifact reduction in truncated CT using Sinogram completion." Proc SPIE Int Soc Opt Eng. Feb. 2005;5747(3):2110-2117. doi: 10.1117/12.595450. PMID: 21874099; PMCID: PMC3161449, 20 pages.
Sharma et al., "Scout-view assisted interior micro-CT." Phys Med Biol. Jun. 21, 2013;58(12):4297-314. doi: 10.1088/0031-9155/58/12/4297. Epub Jun. 4, 2013. PMID: 23732478; PMCID: PMC3732817, 25 pages.

\* cited by examiner

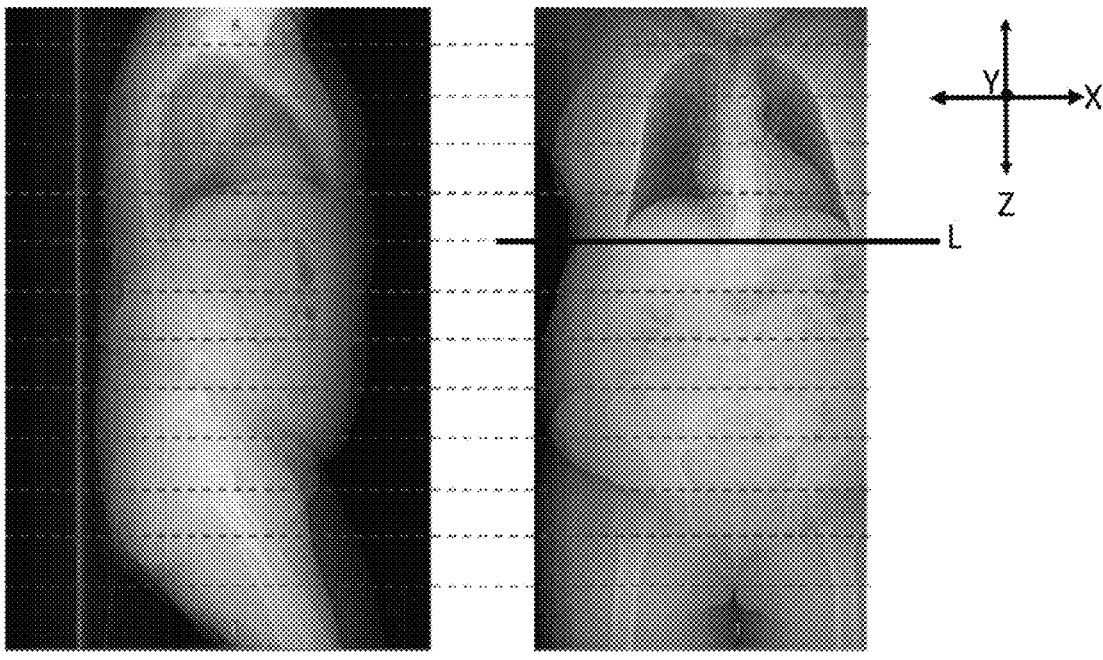
FIG. 4a                    FIG. 4b

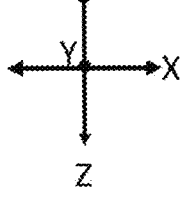
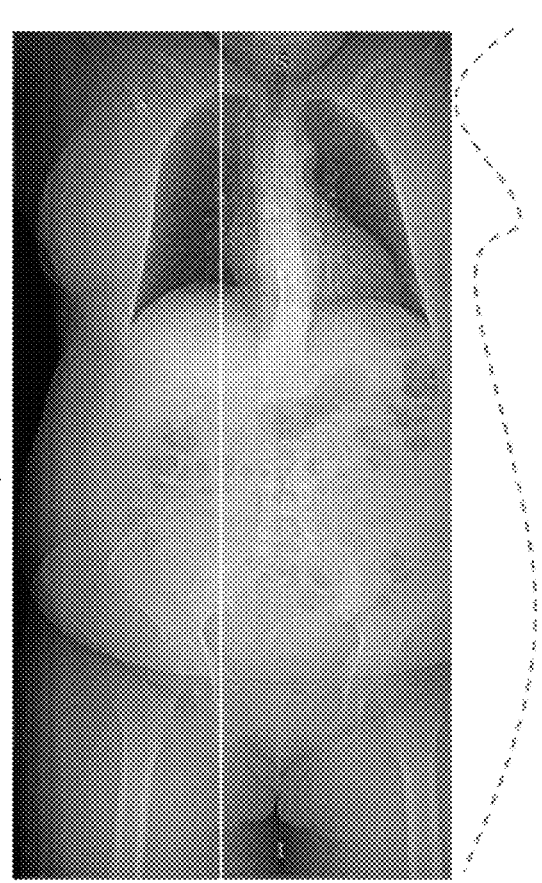
FIG. 6

Recon DFOV

IMAGING SYSTEM AND METHOD TO ESTIMATE CONTOUR OF A SCANNED OBJECT

CROSS-REFERENCE TO RELATED APPLICATIONS

This application claims priority to Chinese Patent Application No. 202111049401.2, filed on Sep. 8, 2021, the disclosure of which is incorporated herein by reference in its entirety.

TECHNICAL FIELD

The present invention relates to medical imaging, and in particular to an imaging system and a method for determining a display field of view.

BACKGROUND

A medical imaging system is usually used to acquire slice images of a scanned object (i.e., diagnostic images) to provide information needed for diagnosis or treatment. In the case of computed tomography (CT), for example, X-rays are emitted by a tube and then pass through the scanned object. The attenuated rays are detected by an X-ray detector and the projection signal collected and converted by a data acquisition system (DAS) is reconstructed to acquire the slice images. When performing a CT scan, it is usually necessary to configure a scan field of view (SFOV) and a display field of view (DFOV). The SFOV is a scanning range set by the CT apparatus itself (e.g., 50 cm). For different examination regions, an appropriate size of SFOV may be selected to ensure that the SFOV covers the examination region and that the resolution of the displayed image can be improved. The DFOV is usually within the range of the SFOV, and is a display range of a reconstructed image through configuration prior to the examination.

When scanning, the scanned object is usually placed within the SFOV. For example, by means of aligning the center of the scanned object with the center of the SFOV, the SFOV covers the scanned object, and thus the reconstructed slice image reflects the complete information of the scanned object. When the scanned object is obese, or the center of the scanned object is shifted, or the scanned object is in a special pose, a portion of the scanned object will be outside of the SFOV and the reconstructed image will be truncated in this case. In this case, image reconstruction with a DFOV that is larger than the SFOV is usually required to provide complete information of the scanned object. However, an excessively large DFOV may cause the resolution of the image to decrease.

Therefore, a novel imaging system and method are needed that can accurately set an appropriate DFOV, so that a reconstructed image can cover the entire contour of a scanned object and have a higher resolution.

SUMMARY

With respect to the above technical problems, provided in embodiments of the present invention is an imaging system, comprising: a positioning image acquisition unit, configured to acquire positioning images of a scanned object from a plurality of angles; a contour estimation unit, configured to estimate a contour of the scanned object in each positioning image in a scanning direction when truncation is present in at least one positioning image; and a display field of view determination unit, configured to select a maximum value of an estimated contour as a display field of view of the image.

In an aspect of the present invention, the imaging system further comprises a truncation determination unit, configured to determine whether truncation is present in the positioning images.

In an aspect of the present invention, the contour estimation unit acquires, from each positioning image, a contour of a non-truncated portion at each position in the scanning direction and performs polynomial fitting to acquire the contour of the scanned object in each positioning image.

In an aspect of the present invention, the contour estimation unit assumes the scanned object corresponding to a truncated portion in the acquired positioning image as a homogeneous body mold, thereby estimating the contour of the scanned object in each positioning image.

In an aspect of the present invention, the contour estimation unit inputs the acquired positioning images into a trained neural network, thereby estimating the contour of the scanned object in each positioning image.

In an aspect of the present invention, the contour estimation unit comprises a preliminary reconstruction unit and a scanned object contour determination unit, the preliminary reconstruction unit roughly reconstructs a slice image of the scanned object based on an extended display field of view, and the scanned object contour determination unit searches for a contour of the scanned object in each of the slice images.

Further provided in embodiments of the present invention is an imaging method, comprising acquiring positioning images of a scanned object from a plurality of angles, estimating a contour of the scanned object when truncation is present in at least one positioning image, and selecting a maximum value of the estimated contour as a display field of view of the image.

In an aspect of the present invention, the imaging method further comprising determining whether truncation is present in the positioning image after acquiring the positioning images of the scanned object.

In an aspect of the present invention, the estimating the contour of the scanned object comprises acquiring, from each positioning image, a contour of a non-truncated portion at each position in a scanning direction and performing polynomial fitting to acquire the contour of the scanned object in each positioning image.

In an aspect of the present invention, the estimating the contour of the scanned object comprises assuming the scanned object corresponding to a truncated portion in the acquired positioning image as a homogeneous body mold, thereby estimating the contour of the scanned object in each positioning image.

In an aspect of the present invention, the estimating the contour of the scanned object comprises inputting the acquired positioning images into a trained neural network, thereby estimating the contour of the scanned object in each positioning image.

In an aspect of the present invention, the estimating the contour of the scanned object comprises performing a preliminary reconstruction of a slice image according to data acquired by an extended display field of view scanning, and searching for a contour of the scanned object in each of these slice images.

One aspect of the present invention further provides a system, including a processor for performing the imaging method according to any one of the foregoing aspects.

One aspect of the present invention further provides a computer-readable storage medium storing a computer program thereon, where the program, when executed by a processor, implements the imaging method according to any one of the foregoing aspects.

Further provided in an aspect of the present invention is a computer program product, comprising a computer program, wherein the computer program, when executed by a processor, implements the steps of any of the above imaging methods.

In the present invention, a contour of a scanned object in each positioning image in a scanning direction is estimated when truncation is present in at least one positioning image, thereby determining a display field of view. Thus, an appropriate DFOV can be set, so that a reconstructed image can cover the entire contour of the scanned object and have a higher resolution.

It should be understood that the brief description above is provided to introduce in a simplified form the technical solutions that will be further described in the Detailed Description. It is not intended that the brief description above defines the key or essential features claimed of the present invention, the scope of which is defined exclusively by the claims. Furthermore, the claimed subject matter is not limited to implementations that solve any disadvantages noted above or in any section of the present disclosure.

These and other features and aspects of the present invention will become clearer through the detailed description with reference to the drawings hereinbelow.

BRIEF DESCRIPTION OF THE DRAWINGS

The accompanying drawings included in the present application are intended to help to further understand embodiments of the present application, constitute a part of the specification, and are used to illustrate implementations of the present application and set forth the principles of the present application together with textual description. Obviously, the accompanying drawings in the following description are merely some embodiments of the present application, and a person of ordinary skill in the art could obtain other implementations according to the accompanying drawings without the exercise of inventive effort. In the accompanying drawings:

FIGS. 4a and 4b show examples of positioning images acquired by the positioning image acquisition unit according to embodiments of the present invention.

FIG. 6 shows an example of an estimated contour of a scanned object acquired by the contour estimation unit according to an embodiment of the present invention.

Figure 1:
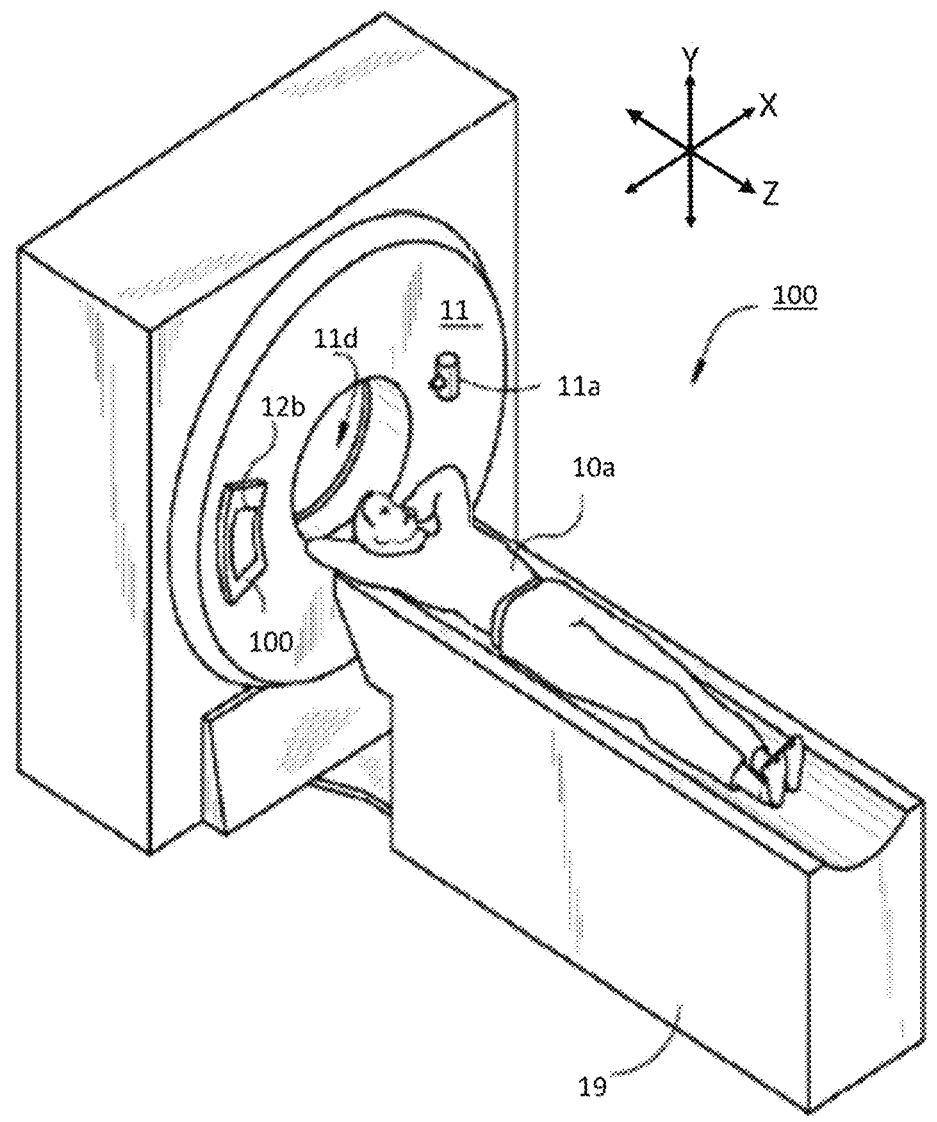
FIG. 1 shows a perspective view of a CT imaging system according to an embodiment of the present invention.

It can be expected that the elements in one embodiment of the present invention may be advantageously applied to the other embodiments without further elaboration.

DETAILED DESCRIPTION

Specific implementations of the present invention will be described below. It should be noted that in the specific description of these embodiments, for the sake of brevity and conciseness, this specification may not describe all features of the actual implementations in detail. It should be understood that in the actual implementation process of any implementations, just as in the process of any engineering project or design project, a variety of specific decisions are often made to achieve specific goals of the developer and to meet system-related or business-related constraints, which may also vary from one implementation to another. Moreover, it can also be understood that although the efforts made in such development process may be complex and lengthy, for those of ordinary skill in the art related to content disclosed in the present invention, some changes in design, manufacturing, production or the like based on the technical content disclosed in the present invention are only conventional technical means. The content of the present invention should not be construed as insufficient.

Unless defined otherwise, technical terms or scientific terms used in the claims and specification should have usual meanings understood by those of ordinary skill in the technical field to which the present invention belongs. The terms "first," "second," and similar terms used in the description and claims of the patent application of the present invention do not denote any order, quantity, or importance, but are merely intended to distinguish between different constituents. The terms "one" or "a/an" and similar terms do not denote a limitation of quantity, but rather the presence of at least one. The terms "include" or "comprise" and similar terms mean that an element or article preceding the term "include" or "comprise" encompasses elements or articles and their equivalent elements listed after "include" or "comprise," and does not exclude other elements or articles. The terms "connect" or "connected" and similar words are not limited to physical or mechanical connections, and are not limited to direct or indirect connections. The term "scanned object" and similar terms refer to an object being scanned and imaged in an imaging scan, which is not only limited to the entirety of the object, but may also represent a specific scan range of the object, i.e., a region of the object or a region of interest valuable for diagnosis. The object is not only limited to a human body, but may also be an animal.

The imaging system and method described herein may be applied to a variety of medical imaging modalities, including but not limited to computed tomography (CT) apparatuses, PET-CT (positron emission tomography, PET), SPECT-CT (single-photon emission computed tomography, SPECT), or any other suitable medical imaging apparatuses. The imaging system may include the aforementioned medical imaging apparatus, and may include a separate computer apparatus connected to the medical imaging apparatus, and may further include a computer apparatus connected to an Internet cloud. The computer apparatus is connected via the Internet to the medical imaging apparatus or a memory for storing medical images. The imaging method may be independently or jointly implemented by the aforementioned medical imaging apparatus, the computer apparatus connected to the medical imaging apparatus, or the computer apparatus connected to the Internet cloud.

As an example, the present invention is described below in conjunction with an X-ray computed tomography (CT) apparatus. Those skilled in the art will appreciate that the present invention may also be applicable to other medical imaging apparatuses suitable for imaging.

Figure 2:
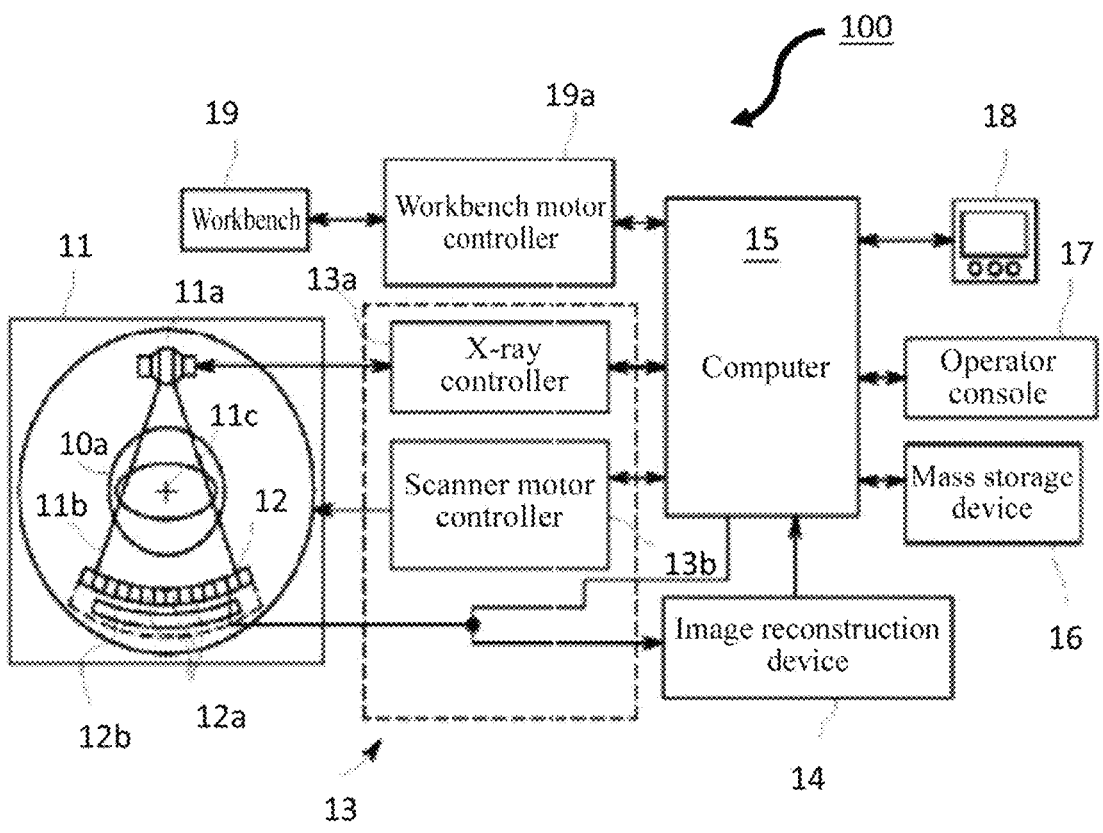
FIG. 2 shows a block diagram of a CT imaging system according to an embodiment of the present invention.

FIG. 1 shows a CT imaging apparatus 100 to which imaging systems and methods according to exemplary embodiments of the present invention are applicable. FIG. 2 is a schematic block diagram of the example CT imaging system 100 shown in FIG. 1.

Referring to FIG. 1, the CT imaging system 100 is shown as including a scanning gantry 11. The scanning gantry 11 has an X-ray source 11a, and the X-ray source 11a projects an X-ray beam 11b toward a detector assembly or collimator 12 on an opposite side of the scanning gantry 11.

Referring to FIG. 2, the detector assembly 12 includes a plurality of detector units 12a and a data acquisition system (DAS) 12b. The plurality of detector units 12a sense the projected X-rays 11b passing through an object 10.

The DAS 12b converts, according to the sensing of the detector units 12a, collected information into projection data for subsequent processing. During the scanning for acquiring the X-ray projection data, the scanning gantry 11 and components mounted thereon rotate around a rotation center 11c.

The rotation of the scanning gantry 11 and the operation of the X-ray source 11a are controlled by a control mechanism 13 of the CT system 100. The control mechanism 13 includes an X-ray controller 13a that provides power and a timing signal to the X-ray source 11a and a scanner motor controller 13b that controls the rotation speed and position of the scanning gantry 11. An image reconstruction device 14 receives the projection data from the DAS 12b and performs image reconstruction. A reconstructed image is transmitted as an input to a computer 15, and the computer 15 stores the image in a mass storage device 16.

The computer 15 also receives commands and scan parameters from an operator through a console 17, and the console 17 has an operator interface in a certain form, such as a keyboard, a mouse, a voice activated controller, or any other suitable input device. An associated display 18 allows the operator to observe the reconstructed image and other data from the computer 15. The commands and scan parameters provided by the operator are used by the computer 15 to provide control signals and information to the DAS 12b, the X-ray controller 13a, and the scanning gantry motor controller 13b. In addition, the computer 15 operates a workbench motor controller 19a, which controls a workbench 19 so as to position the object 10 and the scanning gantry 11. In particular, the workbench 19 moves the object 10 in whole or in part to pass through a scanning gantry opening 11d in FIG. 1.

Figure 3:
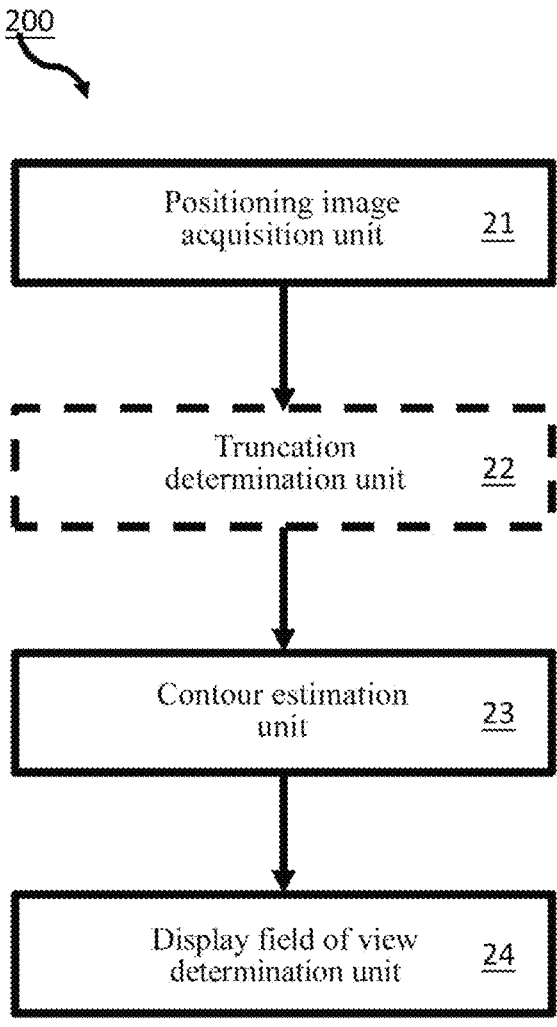
FIG. 3 shows a block diagram of an imaging system according to an embodiment of the present invention.

FIG. 3 shows an example block diagram of an imaging system 200 according to an embodiment of the present invention. The imaging system 200 includes a positioning image acquisition unit 21, a contour estimation unit 23 and a display field determining unit 24. For example, the units 21, 23, 24 may be implemented as part of the computer 15 of the CT imaging system 100 shown in FIG. 1 and FIG. 2, or executed by the computer 15. The positioning image acquisition unit 21 is configured to acquire positioning images of the scanned object from a plurality of angles. The contour estimation unit 23 is configured to estimate the contour of the scanned object in each positioning image when truncation is present in at least one of the acquired positioning images. The display field of view determination unit 24 is configured to select a maximum value of the estimated contour as a display field of view of the image. Optionally, the imaging system 200 further includes a truncation determination unit 22, configured to determine whether truncation is present in the positioning image, and it can be understood that the truncation determination unit 22 is non-essential, which is thus indicated by a dashed box in the figure. Each unit is respectively explained in detail below.

The positioning image acquisition unit 21 is configured to acquire positioning images of the scanned object from a plurality of angles. For example, a positioning scan is performed before a diagnostic scan in CT scan imaging. That is, an X-ray tube in a scanning gantry is kept fixed at a preset position during the positioning scan, a scanning bed moves in a scanning direction (i.e., an axis direction of the scanned object or a z-direction) during exposure, and at the same time, the X-ray tube emits low-dose X-rays to the scanning object, and a CT scanner reconstructs a plane positioning image according to signals detected by a detector. The positioning image acquired from the positioning scan contains a region of interest of the scanned object. The positioning image may be used to set appropriate scanning parameters for a subsequent diagnostic scan of the region of interest, such as a scanning start position and a scanning end position, an angle, a layer thickness, scan field of view etc. of the region to be scanned. For example, the region of interest may include the chest, abdomen, lower extremities, etc. For example, the positioning image acquisition unit 21 can acquire positioning images from a plurality of angles. For example, a frontal positioning image is acquired when the gantry is located at a 0° position, i.e., the X-ray tube is directly above the scanned object, and a lateral positioning image is acquired when the gantry rotates at a 90° position, i.e., the X-ray tube is on the side of the scanned object. This frontal positioning image may reflect the width of the scanned object, i.e. the dimension of the scanned object in the X-axis direction of the gantry; while the lateral positioning image may reflect the thickness of the scanned object, i.e. the dimension of the scanned object in the Y-axis direction of the gantry. In other embodiments, the positioning image acquisition unit 21 may additionally acquire positioning images from other angles, or only acquire positioning images from a plurality of other angles, e.g., positioning images when the scanner gantry rotates at a plurality of angles such as 45°, 135°, 225°, etc. For example, FIGS. 4a and 4b show the frontal positioning image and the lateral positioning image of the scanned object acquired by the positioning image acquisition unit 21, respectively.

For example, the imaging system 200 includes a truncation determination unit 22, configured to determine whether truncation is present in the positioning image. In FIG. 3, the truncation determination unit 22 is represented by a dashed box. It can be understood that the truncation determination unit 22 is optional. In some embodiments, the imaging system 200 may not include the truncation determination unit 22. Thus, determination whether any truncation occurs may be made by a scanning operator by observing the positioning images. In other embodiments, the imaging system 200 may include the truncation determination unit 22. Thus, determination whether any truncation occurs may be automatically made by a computer without human intervention, thereby improving the scanning and imaging efficiency of the scanned object. The truncation determination unit 22 may firstly pre-process the acquired positioning image. For example, such pre-processing may include smoothing filtering, etc. The truncation determination unit 22 further converts the positioning image from a grayscale image to a binary positioning image. For example, by comparing the grayscale value of each pixel with a specific threshold, if it is greater than the threshold, then the value of the pixel is 1, while if it is less than the threshold, then the value of the pixel is 0. By converting to a binary image, the amount of data in the image can be greatly reduced, so that the contour of the scanned object can be highlighted, and the amount of data for processing and compression is small. The truncation unit 22 further acquires an anatomy mask of the scanned object according to the transformed binary positioning image, i.e., the value of the pixel of the anatomical structure portion is 1 and the value of the pixel of the air portion is 0. The truncation determination unit 22 further determines whether truncation occurs, i.e., if the values of multiple edge pixels of the binary positioning image of the scanned object appear to be consecutive 1s, then it can be determined that the positioning image is truncated.

The contour estimation unit 23 is configured to estimate a contour of the scanned object in each positioning image in a scanning direction when truncation is present in at least one positioning image. If no truncation is present in the positioning image, the display field of view of the image can be acquired directly according to the positioning image without the contour estimation unit 23 estimating the contour of the scanned object. The contour estimation unit 23 respectively estimates the contours of the scanned object in a plurality of positioning images, e.g., respectively estimating contours of the scanned object in the aforementioned frontal positioning image and lateral positioning image. The contour estimation unit 23 can be implemented using a variety of methods, for example, polynomial fitting, assumption where the truncated portion is a homogeneous body mold, deep learning, and other methods, and the example methods are described in detail below.

Figure 5A:
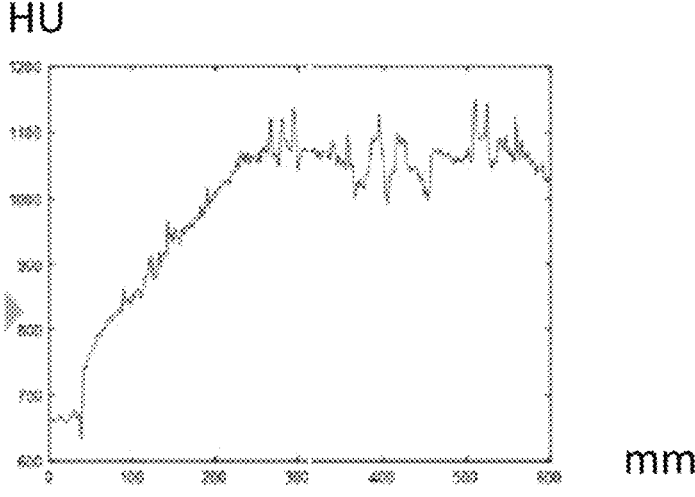
FIG. 5a shows an example of a CT value distribution of a scanned object at a specific position in a positioning image according to an embodiment of the present invention.
Figure 5B:
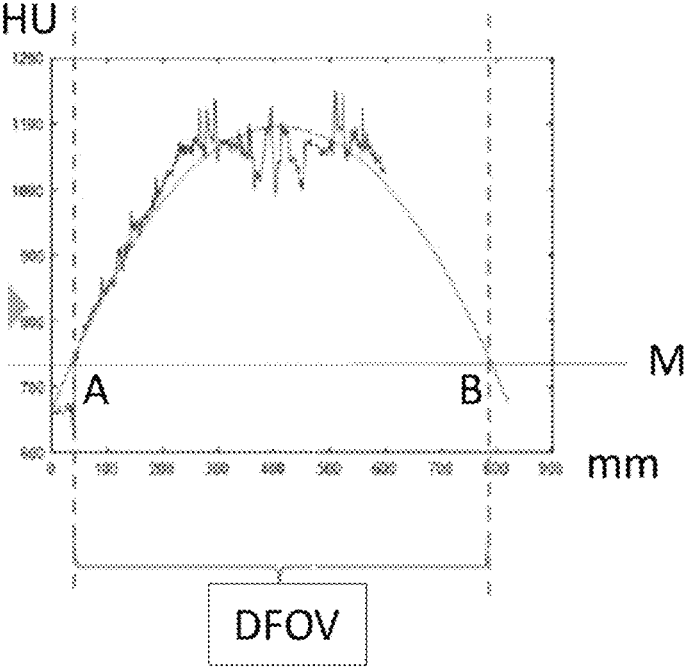
FIG. 5b shows an example of a fitted CT value distribution of a scanned object at a specific position in a positioning image according to an embodiment of the present invention.
Figure 7:
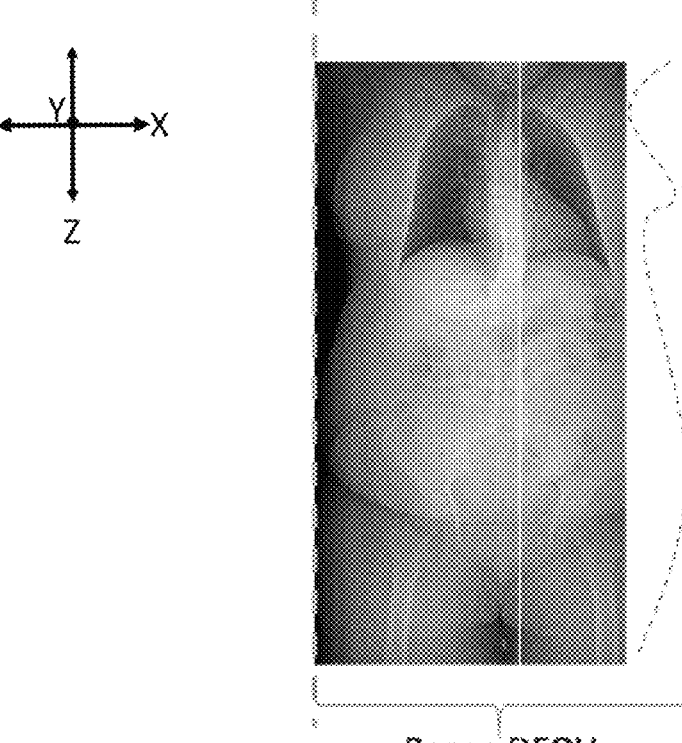
FIG. 7 shows an example of a display field of view determination unit determining a display field of view according to an embodiment of the present invention.

For example, the contour estimation unit 23 may use polynomial fitting to estimate the contour of the scanned object. Specifically, FIG. 5*a* shows the CT value distribution of a non-truncated portion of the scanned object at a specific position in the scanning direction in the positioning image. For example, it corresponds to the CT value distribution of the scanned object at the position shown by line L in the frontal positioning image as shown in FIG. 4*b*. In the figure, the horizontal axis represents the width dimension of the scanned object (i.e., the dimension in the X-axis direction perpendicular to the Z-axis direction), the vertical axis represents the CT value of the scanned object (i.e., HU value), and the curve in the figure represents the CT value distribution of the scanned object at a specific position in a scanning direction in the positioning image. It can be seen that the positioning image is truncated at 600 mm in the X-axis direction, and the curve does not show the CT value of the truncated portion of the scanned object. As shown in FIG. 5*b*, the contour estimation unit 23 uses a polynomial fitting to estimate the CT value distribution of the scanned object at a specific position in the scanning direction. The fitted CT value distribution of the scanned object has an arc-shaped curve, which fits the CT value distribution beyond the 600 mm portion, i.e., the CT value distribution corresponding to the truncated portion. Further, as shown in FIG. 5*b*, the horizontal line M parallel to the X-axis shows a specific threshold set according to the scanned object and background distribution in the positioning image, and the points A and B where the fitted CT value distribution curve crosses the horizontal line M are the outermost contour points in the width direction of the scanned object at a specific position in the scanning direction. The contour estimation unit 23 estimates the contour points at all positions in the scanning direction in the positioning image according to the aforementioned method, thereby estimating the complete contour of the scanned object in the scanning direction.

In the aforementioned manner, the contour estimation unit 23 estimates the contour of the scanned object in the positioning image at each angle, i.e., acquiring the display field of view of the scanned object at each angle. Optionally, the contour estimation unit 23 further smooths the estimated contour in the acquired positioning image at each angle.

As an example, the contour estimation unit 23 may assume that the truncated portion of the scanned object is a homogeneous body mold, thereby estimating the contour of the scanned object. As an example, it can be assumed as a body mold with a similar CT value as that of a human body, e.g., a body mold made of PP (polypropylene) material, with a CT value of about −80 HU. Specifically, when the acquired frontal positioning image (i.e., the 0° positioning image) contains truncation, while the lateral positioning image (i.e., the 90° positioning image) does not have truncation, the contour of the scanned object may be estimated by using the following method: assuming that, for a specific position in the scanning direction (i.e., the Z axis), D represents the sum of all CT values at this position in the 90° positioning image, E represents the sum of all CT values at this position in the 0° positioning image, and F represents the sum of all CT values of the truncated portion at this position in the 0° positioning image, then, $$D=E+F \quad\quad\quad\quad\quad \text{(Equation 1)}$$

Wherein, D and E can be acquired directly from the positioning image, so that the value of F can be calculated. Further, it is assumed that the truncated portion of the scanned object is a homogeneous body mold, so that the length of the truncated portion at the position of the scanning direction in the 0° positioning image can be calculated based on the value of F and the CT value of the body mold. By performing the aforementioned calculation for all positions in the scanning direction within the scanning range, the estimated contour of the truncated portion can be acquired, thereby acquiring the estimated contour of the scanned object.

When both the acquired frontal positioning image (i.e., the 0° positioning image) and lateral positioning image (i.e., the 90° positioning image) contain truncations, the contour of the scanned object may be estimated by using the following method: assuming that, for a specific position in the scanning direction (i.e., the Z axis), H represents the sum of all CT values at this position in the 90° positioning image, I represents the sum of all CT values of the truncated portion at this position in the 90° positioning image, J represents the sum of all CT values at this position in the 0° positioning image, and K represents the sum of all CT values of the truncated portion at this position in the 0° positioning image, then, $$H + I = J + K \qquad \text{(Equation 2)}$$

Wherein, H and J may be acquired directly from the positioning image, and with another assumption that the truncated portion of the scanned object is a homogeneous body mold, then I equals to K, so that the values of I and K can be calculated. Further, the length of the truncated portion at this position in the scanning direction in the 90° positioning image and the 0° positioning image can be calculated based on the values of I and K and the simulated CT value of the body mold, respectively. By performing the aforementioned calculation for all positions in the scanning direction within the scanning range, the estimated contour of the truncated portion can be acquired, thereby acquiring the estimated contour of the scanned object.

As an example, the contour estimation unit 23 may estimate the contour of the scanned object by means of deep learning. Specifically, the contour estimation unit 23 inputs the acquired positioning images into a trained neural network, thereby estimating the contour of the scanned object in each positioning image. The trained neural network can be trained in advance using a large number of positioning images with manually outlined positioning images. As an example, the same neural network can be used for positioning images from different angles, thereby simplifying the types of neural networks, and on the other hand increasing the amount of data for training with the same number of scanned objects. Further, as an example, different neural networks can be used for positioning images from different angles respectively, thereby increasing the accuracy of each neural network. As an example, neural networks such as a U-net or Res-UNet network may be used.

As an example, corresponding to the frontal positioning image shown in FIG. 4b, the contour estimation unit 23 acquires an estimated contour of the scanned object as shown in FIG. 6 by using the aforementioned method. In the aforementioned method, only positioning images from a plurality of angles need to be reconstructed. Thus, the calculation amount thereof is small and the calculation speed is fast.

The display field of view determination unit 24 is configured to select the maximum value of the estimated contour as the display field of view of the image. As previously described, the contour estimation unit 23 acquires complete estimated contours of the scanned object in positioning images from a plurality of angles, including, for example, the estimated contours of the scanned object in the frontal positioning image and the lateral positioning image. The display field of view determination unit 24 determines the display field of view of the scanned object by comparing the estimated contours in positioning images from a plurality of angles. As an example, the maximum value of the estimated contour (the maximum width of the scanned object along the X-axis) is selected as the display field of view through comparison. As shown in FIG. 6, a dashed straight line in the scanning direction determines the display field of view, wherein the outermost portion of the estimated contour of the truncated portion of the scanned object is taken as one side of the display field of view, i.e., the maximum value of the estimated contour is selected as the display field of view, so that the display field of view covers the entire scanned object. The imaging system 200 subsequently uses the display field of view as a reconstruction field of view to reconstruct the data acquired by the diagnostic scan (i.e., a spiral scan), thereby acquiring and displaying a medical image of the scanned object.

Figure 8:
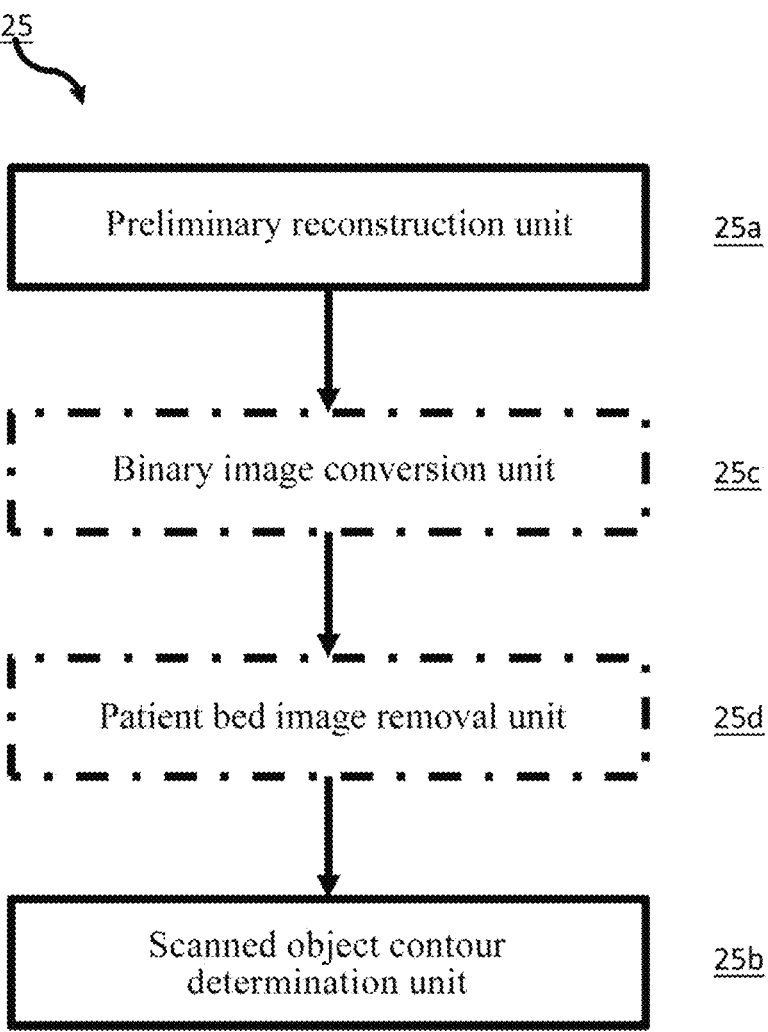
FIG. 8 shows an example of a contour estimation unit of an imaging system according to an embodiment of the present invention.

In some embodiments, the imaging system 200 may perform a diagnostic scan after acquiring the positioning images, and the contour estimation unit 25 performs a preliminary reconstruction of the slice images of the scanned object based on the extended display field of view when truncation is present in at least one positioning image, and searches for the contour of the scanned object in each slice image. As shown in FIG. 8, the contour estimation unit 25 includes a preliminary reconstruction unit 25a and a scanned object contour estimation unit 25b. The preliminary reconstruction unit 25a either roughly or completely reconstructs the slice image with an expanded display field of view, thereby acquiring a slice image of the scanned object. This extended field of view may exceed the possible display field of view of the CT device to a large degree. For example, the usual scanning field of view of a CT device is 50 cm. This extended field of view may be set as 80 cm. Then the contour prediction unit 22 roughly reconstructs the slice image with a truncation image reconstruction algorithm. It can be understood that although the slice image reconstructed with an extended field of view shows the complete image of the scanned object at a specific position in the z-axis direction, the truncated portion of the scanned object (i.e., the portion beyond the scanned field of view) is estimated by a reconstruction algorithm and not reconstructed based on the truly detected signal by the X-ray detector. As the purpose of the preliminary reconstruction is to estimate the contour of the scanned object, which does not require high image quality, a rough reconstruction can be completed by removing some image correction processes. The preliminary reconstruction requires less computation, has a high reconstruction speed, and can acquire the slice images in a timely manner.

The scanning object contour estimation unit 25b further determines the estimated contour of the scanned object in each slice image, and thus a complete estimated contour of the scanned object can be acquired. It can be understood that the contour of the truncated portion of the scanned object is an estimated contour rather than a realistically detected contour. As an example, the contour estimation unit 25 may include a binary image conversion unit that may convert the preliminarily reconstructed slice image to a binary image before determining the estimated contour of the scanned object in each slice image. The contour estimation unit 25 may include a patient bed image removal unit 25d which removes the patient bed from the slice image, and the image data of the patient bed may be derived from the data preset by the imaging system 200. The contour estimation unit 25 may also use a smoothing filter to smooth the estimated contour in each slice image in the scanning direction (Z-axis direction) after determining the estimated contour of the scanned object in each slice image. Further, the display field of view determination unit 24 selects the maximum value of the estimated contour of the scanned object as the display field of view of the image. The imaging system 200 finely reconstructs the data acquired by the diagnostic scan by using the display field of view of the image determined by the display field of view determination unit 24 as the reconstruction field of view to acquire a more accurate image with a higher resolution for diagnostic reference.

Figure 9:
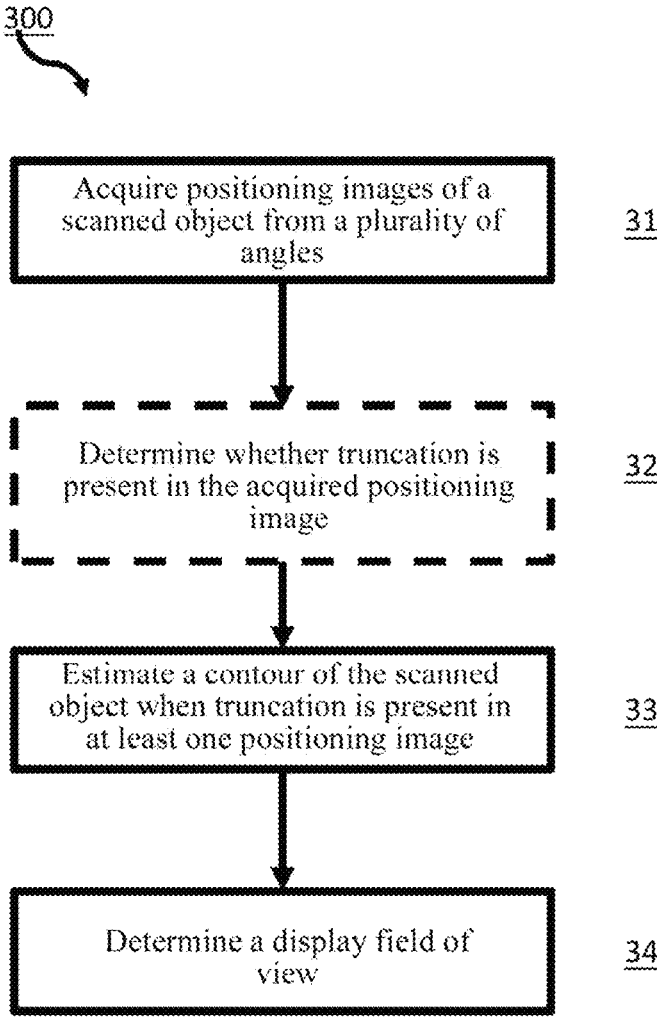
FIG. 9 shows a flowchart block diagram of an imaging method according to an embodiment of the present invention.

FIG. 9 shows an example block diagram of an imaging method 300 according to an embodiment of the present invention. The imaging method 300 includes acquiring positioning images of an scanned object from a plurality of angles; estimating the contour of the scanned object when truncation is present in the at least one positioning image; selecting the maximum value of the estimated contour as the display field of view of the image. For example, the imaging method 300 may be executed by part of the computer 15 of the CT imaging system 100 as shown in FIG. 1 and FIG. 2, or executed by the computer 15. Optionally, the imaging method 300 further includes determining whether truncation is present in the acquired positioning image after acquiring a positioning image of the scanned object. The determination of the presence or absence of truncation in the acquired positioning image is indicated by a dashed box in the figure. It can be understood that this may be carried out by an operator as a manual determination or performed automatically by a computer to improve the scanning efficiency and imaging efficiency of the scanned object. The following is a detailed description of the imaging method 300.

At 31, positioning images of the scanned object from a plurality of angles are acquired. As mentioned above, a positioning scan is performed prior to the diagnostic scan, and the positioning image acquired contains the region of interest of the scanned object. This positioning image can be used to set appropriate scanning parameters for the subsequent diagnostic scan of the region of interest, such as the scanning start position, scanning end position, angle, layer thickness, and scanning field of view of the region to be scanned. For example, the region of interest may include the chest, abdomen, lower extremities, etc. As an example, at 31, a frontal positioning image may be acquired, e.g., when the gantry is at the 0° position, i.e., when the X-ray tube is directly above the scanned object, and a lateral positioning image may be acquired when the gantry is rotated to the 90° position, i.e., when the X-ray tube is on the side of the scanned object. This frontal positioning image may reflect the width of the scanned object and the lateral positioning image may reflect the thickness of the scanned object. In other embodiments, at 31, positioning images from the other angles may be additionally acquired, or only positioning images from a plurality of other angles may be acquired, e.g., acquiring positioning images when the scanner gantry rotates at a plurality of angles such as 45°, 135°, 225°, etc. As an example, FIG. 4*a* and FIG. 4*b* show the acquired frontal positioning image and lateral positioning image of the scanned object, respectively.

At 32, the fact as to whether truncation is present in the acquired positioning image is determined. For determining whether truncation is present in the acquired positioning image, firstly the acquired positioning image may be pre-processed. As an example, such pre-processing may include smoothing filtering, etc. For determining whether truncation is present in the acquired positioning image, the positioning image is further converted from a grayscale image to a binary positioning image. For example, the grayscale value of each pixel is compared with a specific threshold, and if it is greater than the threshold, then the value of the pixel is 1, while if it is less than the threshold, then the value of the pixel is 0. By converting to a binary image, the amount of data in the image can be greatly reduced, so that the contour of the scanned object can be highlighted, and the amount of data for processing and compression is small. For determining whether truncation is present in the acquired positioning image, an anatomy mask of the scanned object is acquired based on the transformed binary positioning image, i.e., the pixel value of the anatomical structure portion is 1 and the pixel value of the air portion is 0. For determining whether truncation is present in the acquired positioning image, the fact as to whether a truncation occurs is further determined, i.e., if the values of multiple edge pixels of the binary positioning image of the scanned object appear to be consecutive 1 s, it can be determined that truncation occurs in the positioning image.

At 33, the contour of the scanned object is estimated when truncation is present in at least one positioning image. If no truncation is present in the positioning image, then the display field of view of the image can be acquired directly from the positioning image without the need to estimate the contour of the scanned object. At 33, the contours of the scanned object in a plurality of positioning images are estimated, respectively. For example, the aforementioned frontal positioning image and the lateral positioning image are estimated, respectively. Predicting the contour of the scanned object can be achieved by various methods, such as those revealed through the aforementioned contour estimation unit 23, which are not repeatedly described herein for brevity.

At 34, the display field of view is determined, wherein the maximum value of the estimated contour is selected as the display field of view of the image. As previously described, at 33, complete estimated contours of the scanned object in positioning images from a plurality of angles are acquired, including, for example, the estimated contours of the scanned object in the frontal positioning image and the lateral positioning image. At 34, the estimated contours in positioning images from a plurality of angles are compared to determine the display field of view of the scanned object. For example, the maximum value of the estimated contour (maximum width value) is selected as the display field of view through comparison. As shown in FIG. 6, a dashed straight line in the scanning direction determines the display field of view, wherein the outermost portion of the estimated contour of the truncated portion of the scanned object is taken as one side of the display field of view, i.e., the maximum value of the estimated contour is selected as the display field of view, so that the display field of view covers the entire scanned object. The imaging method 200 subsequently uses the display field of view as a reconstruction field of view for reconstructing the data acquired by the diagnostic scan (i.e., a spiral scan), thereby acquiring and displaying a medical image of the scanned object.

Figure 10:
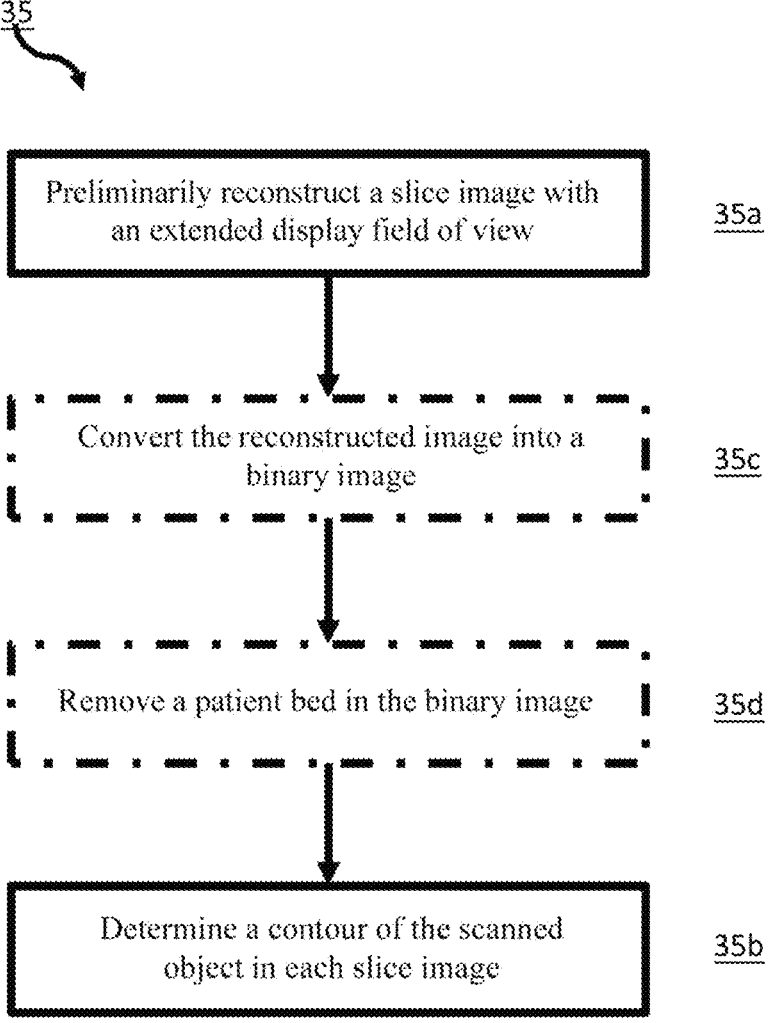
FIG. 10 shows a flowchart block diagram for estimating a contour of a scanned object in an imaging method according to an embodiment of the present invention.

In some embodiments, the imaging method 200 may perform a diagnostic scan after acquiring the positioning image, and at 35, when it is estimated that truncation is present in the contour of the scanned object in the positioning image, perform a preliminary reconstruction of the slice image, i.e., the slice image of the scanned object based on an extended display field of view and then search for the contour of the scanned object in each slice image. As shown in FIG. 10, at 35*a*, the slice image is preliminarily reconstructed with an extended display field of view, thereby acquiring a slice image of the scanned object. This extended field of view may exceed the possible scanning field of view of the CT device to a large degree. For example, the usual scanning field of view of the CT device is 50 cm. This extended field of view may be set as 80 cm. Then the slice image is preliminarily reconstructed with a truncation image reconstruction algorithm. It can be understood that although the slice image reconstructed with an extended field of view shows the complete image of the scanned object at a specific position in the z-axis direction, the truncated portion of the scanned object (i.e., the portion beyond the scanned field of view) is estimated by a reconstruction algorithm and not reconstructed based on the truly detected signal of the X-ray detector. As the purpose of the preliminary reconstruction is to estimate the contour of the scanned object, which does not require high image quality, a preliminary reconstruction can be completed by removing some image artifacts correction processes. The preliminary reconstruction requires less computation, has a high reconstruction speed, and can acquire the slice images in a timely manner.

At 35*b*, the estimated contour of the scanned object in each slice image is further determined and thus, a complete estimated contour of the scanned object can be acquired. It can be understood that the contour of the truncated portion of the scanned object is an estimated contour rather than a realistically detected contour. As an example, at 35*c*, the preliminarily reconstructed slice image may be converted to a binary image before determining the estimated contour of the scanned object in each slice image. At 35*d*, the patient bed is removed from the binary image slice image, and the image data for the patient bed may be derived from the data preset by the imaging system 200. At 25*d*, after determining the estimated contour of the scanned object in each slice image, a smoothing filter may be used to smooth the estimated contour in each slice image in the scanning direction (Z-axis direction). Further, at 34, the maximum value of the estimated contour of the scanned object is selected as the display field of view of the image when determining the display field of view. The imaging method 300 finely reconstructs the data acquired by the diagnostic scan by using the determined display field of view of the image as the reconstruction field of view to acquire a more accurate image with a higher resolution for diagnostic reference.

Figure 11:
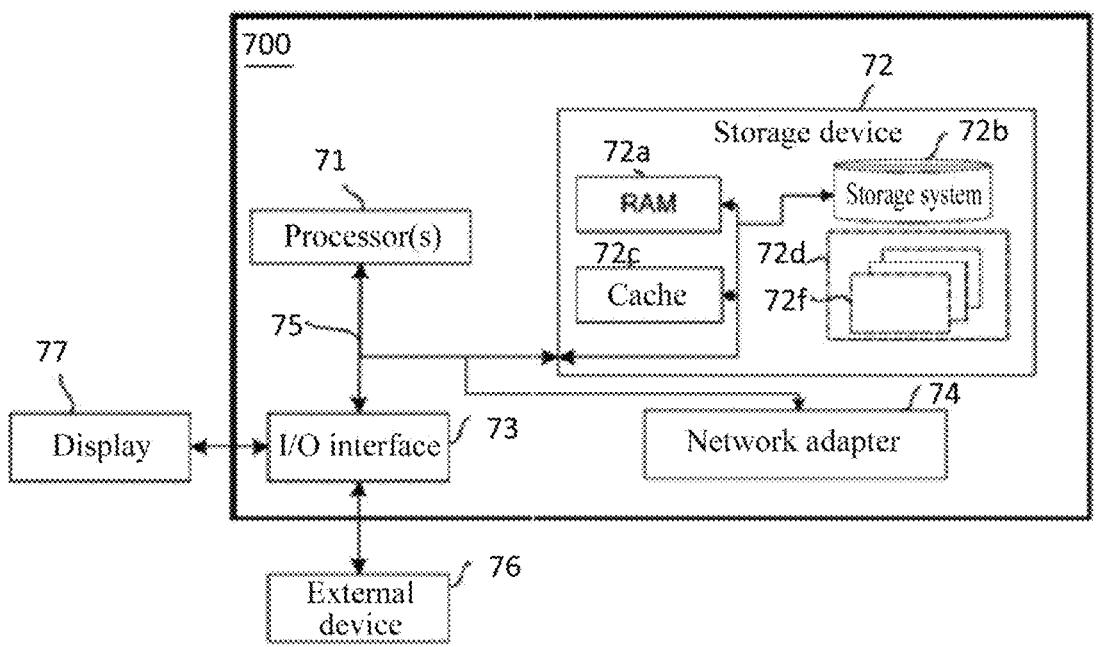
FIG. 11 shows an example of an electronic apparatus that performs an imaging method according to an embodiment of the present invention.

FIG. 11 shows an example of an electronic apparatus 700 that performs an imaging method according to an embodiment of the present invention. The electronic apparatus 700 includes: one or a plurality of processors 71; and a storage device 72, configured to store one or a plurality of programs, where when the one or plurality of programs are executed by the one or plurality of processors 71, the one or plurality of processors 71 are caused to implement the imaging method described herein. The processor is, for example, a digital signal processor (DSP), a microcontroller, an application-specific integrated circuit (ASIC), or a microprocessor.

The electronic apparatus 700 shown in FIG. 11 is only an example, and should not bring any limitation to the function and application scope of the embodiment of the present invention.

As shown in FIG. 11, the electronic apparatus 700 is represented in the form of a general-purpose computing device. The components of the electronic apparatus 700 may include, but are not limited to, one or a plurality of processors 71, a storage device 72, and a bus 75 connecting different system components (including the storage device 72 and the processor 71).

The bus 75 represents one or a plurality of types of bus structures, including a memory bus or a memory controller, a peripheral bus, an accelerated graphics port, a processor, or a local bus using any bus structure in the plurality of bus structures. For example, these architectures include, but are not limited to, an Industrial Standard Architecture (ISA) bus, a Micro Channel Architecture (MAC) bus, an enhanced ISA bus, a Video Electronics Standards Association (VESA) local bus, and a Peripheral Component Interconnect (PCI) bus.

The electronic apparatus 700 typically includes a variety of computer system readable media. These media may be any available medium that can be accessed by the electronic apparatus 700, including volatile and non-volatile media as well as removable and non-removable media.

The storage apparatus 72 may include a computer system readable medium in the form of a volatile memory, for example, a random access memory (RAM) 72*a* and/or a cache memory 72*c*. The electronic apparatus 700 may further include other removable/non-removable, and volatile/non-volatile computer system storage media. Only as an example, a storage system 72*b* may be configured to read/write a non-removable, non-volatile magnetic medium (not shown in FIG. 11, often referred to as a "hard disk drive"). Although not shown in FIG. 11, a magnetic disk drive configured to read/write a removable non-volatile magnetic disk (for example, a "floppy disk") and an optical disc drive configured to read/write a removable non-volatile optical disc (for example, a CD-ROM, a DVD-ROM, or other optical media) may be provided. In these cases, each drive may be connected to the bus 75 via one or a plurality of data medium interfaces. The storage device 72 may include at least one program product which has a group of program modules (for example, at least one program module) configured to perform the functions of the embodiments of the present invention.

A program/utility tool 72*d* having a group (at least one) of program modules 72*f* may be stored in, for example, the storage apparatus 72. Such a program module 72*f* includes, but is not limited to, an operating system, one or a plurality of application programs, other program modules, and program data, and each of these examples or a certain combination thereof may include the implementation of a network environment. The program module 72*f* typically performs the function and/or method in any embodiment described in the present invention.

The electronic apparatus 700 may also communicate with one or a plurality of external devices 76 (such as a keyboard, a pointing device, and a display 77), and may further communicate with one or a plurality of devices that enable a user to interact with the electronic apparatus 700, and/or communicate with any device (such as a network card and a modem) that enables the electronic apparatus 700 to communicate with one or a plurality of other computing devices. Such communication may be carried out via an input/output (I/O) interface 73. In addition, the electronic apparatus 700 may also communicate with one or a plurality of networks (for example, a local area network (LAN), a wide area network (WAN), and/or a public network, such as the Internet) via a network adapter 74. As shown in FIG. 11, the network adapter 74 communicates with other modules of the electronic apparatus 700 through the bus 75. It should be understood that although not shown in the drawing, other hardware and/or software modules, including, but not limited to: microcode, device drivers, redundant processing units, external disk drive arrays, RAID systems, tape drives, data backup storage system, and the like may be used in conjunction with the electronic apparatus 700.

The processor 71 executes various functional applications and data processing by running programs stored in the storage apparatus 72.

According to an embodiment of the present invention, a computer readable medium is further provided. The computer readable medium has instructions thereon, and when executed by a processor, the instructions cause the processor to perform the steps of the method of the present invention. The computer-readable medium may include, but is not limited to, a non-transitory, tangible arrangement of an article manufactured or formed by a machine or apparatus, including a storage medium such as the following: a hard disk; any other type of disk including a floppy disk, an optical disk, a compact disk read-only memory (CD-ROM), a compact disk rewritable (CD-RW), and a magneto-optical disk; a semiconductor device such as a read-only memory (ROM), a random access memory (RAM) such as a dynamic random access memory (DRAM) and a static random access memory (SRAM), an erasable programmable read-only memory (EPROM), a flash memory, and an electrically erasable programmable read-only memory (EEPROM); a phase change memory (PCM); a magnetic or optical card; or any other type of medium suitable for storing electronic instructions. The computer-readable medium may be installed in a CT device, or may be installed in a separate control device or computer that remotely controls the CT device.

According to an embodiment of the present invention, a computer readable medium is further provided. The computer readable medium has instructions thereon, and when executed by a processor, the instructions cause the processor to perform the steps of the method of the present invention.

According to embodiments of the present invention, a computer program product is further provided, comprising a computer program, wherein the computer program, when executed by a processor, implements the aforementioned method of the present invention.

Figure 12:
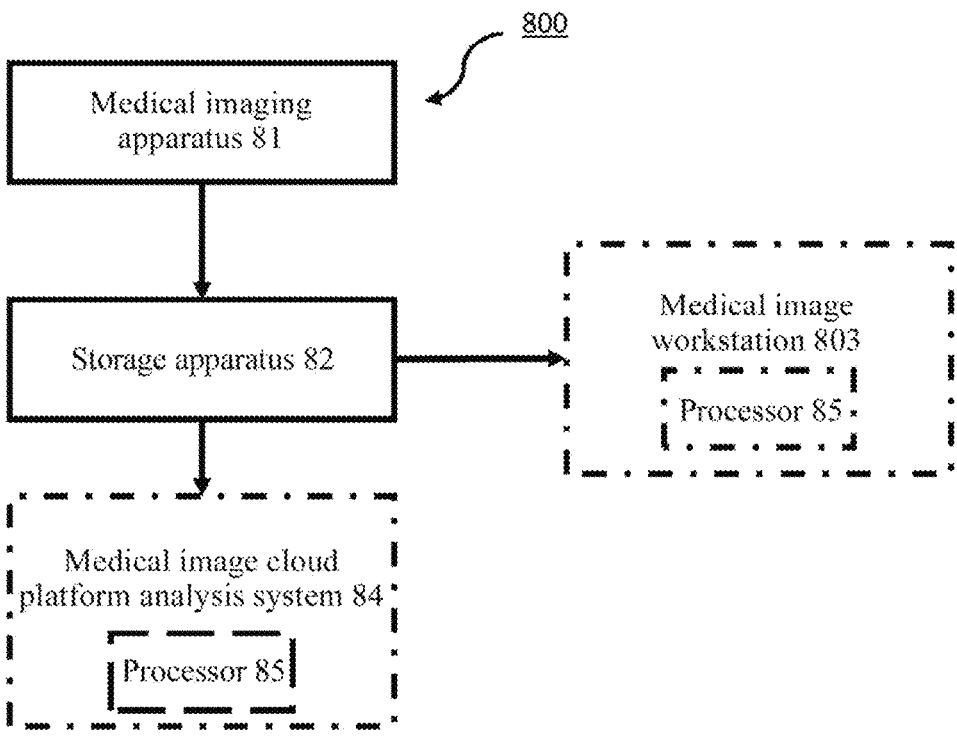
FIG. 12 shows an example of an imaging system that performs an imaging method according to an embodiment of the present invention.

FIG. 12 shows a block diagram of an exemplary imaging system 800 according to an embodiment of the present invention. Referring to FIG. 12, the imaging system 800 may include a medical imaging apparatus 81 configured to perform imaging scanning to generate a medical image, a storage apparatus 82 configured to store the medical image, and a medical image workstation 83 or a medical image cloud platform analysis system 84 communicatively connected to the storage apparatus 82 and including a processor 85. The processor 85 may be configured to perform the foregoing imaging method of the present invention.

The medical imaging apparatus 81 may be a CT apparatus, a PET-CT (Positron Emission Tomography, PET), SPECT-CT (Single-Photon Emission Computed Tomography, SPECT), or any other suitable medical imaging apparatuses. The storage apparatus 82 may be located in the medical imaging apparatus 81, a server external to the medical imaging apparatus 81, an independent medical image storage system (such as a PACS), and/or a remote cloud storage system. The medical imaging workstation 83 may be disposed locally at the medical imaging apparatus 81, that is, the medical imaging workstation 83 being disposed adjacent to the medical imaging apparatus 81, and the two may be co-located in a scanning room, a medical imaging department, or the same hospital. The medical image cloud platform analysis system 84 may be located away from the medical imaging apparatus 81, for example, arranged at the cloud in communication with the medical imaging apparatus 81. For example, after a medical institution completes an imaging scan using the medical imaging apparatus 81, data acquired by the scanning is stored in the storage apparatus 82. The medical imaging workstation 83 may directly read the data acquired by the scanning, and process the data by using the method of the present invention via its processor. As another example, the medical image cloud platform analysis system 84 may read the medical image in the storage apparatus 82 via remote communication to provide "software as a service (SaaS)." SAAS can exist between hospitals, between a hospital and an imaging center, or between a hospital and a third-party online diagnosis and treatment service provider.

The technology described in the present invention may be implemented at least in part through hardware, software, firmware, or any combination thereof. For example, aspects of the technology may be implemented through one or more microprocessors, digital signal processors (DSP), application-specific integrated circuits (ASIC), field programmable gate arrays (FPGA), or any other equivalent integrated or separate logic circuits, and any combination of such parts embodied in a programmer (such as a doctor or patient programmer, stimulator, or the other apparatuses). The term "processor", "processing circuit", "controller" or "control module" may generally refer to any of the above noted logic circuits (either alone or in combination with other logic circuits), or any other equivalent circuits (either alone or in combination with other digital or analog circuits).

Some illustrative embodiments of the present invention have been described above. However, it should be understood that various modifications can be made to the exemplary embodiments described above without departing from the spirit and scope of the present invention. For example, an appropriate result can be achieved if the described techniques are performed in a different order and/or if the components of the described system, architecture, apparatus, or circuit are combined in other manners and/or replaced or supplemented with additional components or equivalents thereof; accordingly, the modified other embodiments also fall within the protection scope of the claims.

What is claimed is:

1. An imaging system, comprising:
   a positioning image acquisition unit, configured to acquire positioning images of a scanned object from a plurality of angles;
   a truncation determination unit configured to detect truncation in a positioning image by converting the positioning image to a binary image using a threshold and determining that edge pixels consecutively above the threshold indicate truncation;
   a contour estimation unit, configured to estimate a contour of the scanned object in each positioning image in a scanning direction when truncation is present in at least one of the positioning images, wherein the contour estimation unit:
      acquires, from each positioning image, a contour of a non-truncated portion at each position in the scanning direction;
      estimates the contour points at all positions in the scanning direction in the positioning images to estimate a complete contour of the scanned object; and
      performs polynomial fitting beyond the truncated edge and locates outer contour points as the points where the fitted curve crosses a threshold line; and
   a display field of view determination unit, configured to select a maximum value of the estimated contour across the plurality of angles and apply the display field of view as a reconstruction field of view in a diagnostic scan.

2. The imaging system according to claim 1, wherein the contour estimation unit inputs the acquired positioning images into a trained neural network, thereby estimating the contour of the scanned object in each positioning image.

3. The imaging system according to claim 1, wherein the contour estimation unit comprises a preliminary reconstruction unit and a scanned object contour determination unit, the preliminary reconstruction unit reconstructs a plurality of slice images of the scanned object based on an extended display field of view, and the scanned object contour determination unit searches for a contour of the scanned object in each of the slice images.

4. An imaging method, comprising:
   acquiring, via a positioning image acquisition unit, positioning images of a scanned object from a plurality of angles;
   detecting, via a truncation unit, truncation in a positioning image by converting the positioning image to a binary image using a threshold and determining that edge pixels consecutively above the threshold indicate truncation;

estimating, via a contour estimation unit, a contour of the scanned object when truncation is present in at least one of the positioning images, wherein estimating the contour includes:

acquiring, from each positioning image, a contour of a non-truncated portion at each position in the scanning direction;

estimating the contour points at all positions in the scanning direction in the positioning images to estimate a complete contour of the scanned object; and performing polynomial fitting beyond the truncated edge and locates outer contour points as the points where the fitted curve crosses a threshold line; and selecting, via a display field of view determination unit, a maximum value of the estimated contour across the plurality of angles and apply the display field of view as a reconstruction field of view in a diagnostic scan.

5. The imaging method according to claim 4, wherein the estimating the contour of the scanned object comprises assuming the scanned object corresponding to a truncated portion in the acquired positioning image as a homogeneous body mold, thereby estimating the contour of the scanned object in each positioning image.

6. The imaging method according to claim 4, wherein the estimating the contour of the scanned object comprises inputting the acquired positioning images into a trained neural network, thereby estimating the contour of the scanned object in each positioning image.

7. The imaging method according to claim 4, wherein the estimating the contour of the scanned object comprises performing a preliminary reconstruction of a slice image at a specific position in a scanning direction based on an extended display field of view, and searching for a contour of the scanned object in each of the slice images.

8. A system, comprising a processor configured to perform the imaging method according to claim 4.

9. A computer program product, comprising a computer program, wherein the computer program, when executed by a processor, implements the steps of the method according to claim 4.

\* \* \* \* \*